2,825,635
Patented Mar. 4, 1958

2,825,635

PARAFFIN WAX COMPOSITION

William E. Dooley, Rahway, and James Prophet, Jr., Cranford, N. J., assignors to Esso Research and Engineering Company, a corporation of Delaware No Drawing. Application January 23, 1956
Serial No. 560,861

5 Claims. (Cl. 44—7.5)

The present invention relates to an improved candle and more particularly to a low melting paraffin wax candle that has superior burning properties.

Waxes are generally classified as crystalline and microcrystalline wax. The present invention is not concerned with microcrystalline waxes, but rather concerns the petroleum crystalline waxes. Specifically, it concerns scale wax candles, especially those used for religious purposes. Scale wax contains substantial amounts of oil, for example about 2% by weight. This oil tends to bleed and leave an unsightly film on the candles' surface. Of course this can be overcome by removing the oil, but such processes are expensive. It is therefore one of the objects of this invention to teach a method of eliminating this problem without the need of further refining the wax to remove the oil.

Another object of this invention is to prevent wax hang-up. It is best described as the waxy deposit left on the inner walls of the glass vessels in which the candles are burned.

A further object of this invention is to prevent candle deformation brought about by exposure to moderate heat.

The objects described above are achieved by blending a low melting, narrow cut paraffin wax that has a melting point between 110° and 125° F. A. M. P. and a boiling range of 50° to 100° F. at 10 mm. of mercury absolute pressure between its 5% and 95% distillation points, with about 0.5% to 15%, and preferably 3% to 7% by weight, of a crystalline paraffin wax having a melting point between 145° and 160° F. A. M. P.

The term "scale wax" as used herein means a paraffin wax having between about 1% to 2.5% oil by weight. This is opposed to a refined wax which has been processed to have an oil content of less than 0.5% by weight. The abbreviation A. M. P. means American Melting Point, and may be defined as 3° F. above the A. S. T. M. method melting point.

In order to aid in a full understanding of this invention, a description will be presented of suitable processes for obtaining the paraffin waxes to be used. An excellent source of wax is crude oil which contains large quantities of paraffins having chain lengths in the range of about $C_{20}$ to $C_{60}$.

To concentrate the waxy constituents, the crude oil is generally fractionated by distillation. The desired fraction is cooled sufficiently to precipitate the wax, which is then separated by filtration. For instance, distillate stock boiling between 290° and 622° F. at 10 mm. of mercury absolute pressure is cooled to a temperature of about 20° to 40° F., and pumped through a plate and frame filter press to separate the wax from the remaining oil. The resulting wax cake has a boiling range of about 150° F. at 10 mm. of mercury absolute pressure between its 5% and 95% distillation points.

Another method of dewaxing is known as "solvent dewaxing." A number of suitable solvents may be employed, but those most often used are propane, benzol, ethylene-chloride, toluol, acetone, carbon tetrachloride and a mixture of 75% of methyl-ethyl-ketone and 25% toluol. The procedure in this process involves mixing 3 to 8 parts of solvent with one part of wax and chilling to between 20° and 40° F. to precipitate the wax. The separation may be carried out in a rotary filter, or alternatively, by centrifuging, or in plate-and-frame presses.

The scale wax is then processed to obtain the desired cut of normal paraffin wax. For example, the wax cake can be distilled at reduced pressure in a suitable pipe still. Usually the lowest boiling 50% fraction of the scale wax is recovered and used as the major constituent in the candle. In the case of San Joaquin wax, this portion of the wax cake boils between about 380° and 510° F. at 10 mm. of mercury absolute pressure having its 5% and 95% points between about 400° to 500° F. at 10 mm. of mercury absolute pressure.

The high melting refined paraffin wax fraction may be obtained from the scale wax by further refining it by a process known as sweating. Sweating is essentially a slow melting process which both reduces the oil content and separates the wax into various melting point grades. It involves solidifying the wax by means of passing cold water through coils in the wax layer. Thereafter, warm water is passed through the tubes in such a manner as to gradually increase the temperature and allow the oil and low melting point waxes to liquefy and drain off. The substantially oil-free wax remaining is melted from the sweater and may be further refined, for instance by acid treatment, or mild hydrogenation. The highest boiling 5% portion of this refined wax, often referred to as the "bottom," is the paraffin wax which comprises the minor portion of the candle. It has a melting point between 145° and 160° F. A. M. P. and an oil content of about 0.2% by weight. If the high melting paraffin wax is obtained from San Joaquin crude, for example, it will boil between about 590° and 622° F. at 10 mm. of mercury absolute pressure.

While many other processes may be employed, and many modifications and refinements of these processes may be adopted in securing a wax in accordance with this invention, a preferred embodiment of this invention will be fully described.

The major constituent of the wax may be obtained from a waxy oil, such as a fraction obtained from the distillation of a paraffinic crude oil boiling up to about 900° F. that has been extracted with a suitable solvent. A suitable waxy feed stock that may be employed is a reduced San Joaquin paraffin distillate having a 31.4° API gravity, and an initial boiling point of 290° F., and a final boiling point of 622° F. at 10 mm. of mercury absolute pressure. The wax cake obtained after the dewaxing step contains about 1.5% oil. The wax is then distilled to obtain the desired cut, for example, that fraction boiling between 380° and 510° F., having 5% and 95% distillation points at 416° and 486° F. at 10 mm. of mercury absolute pressure, respectively.

The minor constituent of the candle is obtained from the high boiling fraction of refined wax having a crystalline structure. For example, the wax cake obtained by the dewaxing process above is sweated or re-extracted with methyl-ethyl-ketone and toluol to produce a wax having an oil content of about ½%, and preferably less than ½%. The de-oiled wax may be mildly hydrogenated, or alternatively acid treated and neutralized with caustic, to improve its characteristics. Finally, the wax is fractionally distilled to permit separation of the high boiling components. For example, a San Joaquin paraffin wax cake, having an initial boiling point of 396° F. and a final boiling point of 603° F. at 10 mm. of mercury absolute pressure, and an oil content of approximately 1.5%, is extracted with a solvent composed of 75% methyl-ethyl-ketone and 25% toluol by slurrying one part of wax with six parts of solvent. The wax-solvent mixture is chilled to 30° F. to precipitate the wax and allow separation by means of a rotary filter. The extracted wax may be mildly hydrogenated before being fractionally distilled to obtain the highest boiling 5% portion of the wax, for example the fraction boiling between 590° and 622° F. at 10 mm. of mercury absolute pressure. One-half to 15% by weight of this high boiling fraction is blended with the low melting narrow cut paraffin wax previously described, by admixing both waxes while in a liquid state. The resulting mixture melts between 110° and 125° F. A. M. P. and has an oil content of between about 1% and 2% by weight.

EXAMPLE I

A low melting, narrow cut paraffin wax derived from San Joaquin crude having a melting point of 116° F. A. M. P., and 5% and 95% distillation points of 416° and 486° F. at 10 mm. of mercury absolute pressure, was blended with 5% by weight of paraffin wax obtained from the same crude and having a melting point of 155° F. A. M. P. and boiling between about 590° and 622° F. at 10 mm. of mercury absolute pressure. The resulting candle had a melting point of 119° F. A. M. P. and 1.8% by weight of oil.

For comparison purposes, a conventional paraffin wax candle having an equivalent amount of oil was prepared. It had a melting point of 130° F. and a boiling range of 132° F. at 10 mm. of mercury absolute pressure between its 5% and 95% distillation points. Both candles were evaluated for the properties listed in the first column of Table I.

*Table I*

| Property | Improved Candle | Conventional Candle |
| --- | --- | --- |
| Deformation | Slight Sag | Collapsed. |
| Bulging | Satisfactory | Some bulging. |
| Bleeding | None | Moderate. |
| Incrustation | None | Moderate. |

The deformation property is determined by exposing candles of the same overall dimensions to moderate heat (98° F.) for 16 hours, and examining their appearance at the end of this time.

Bulging is tested by measuring the base of the candle before and after the molding operation. A swelling of not more than two thirty-seconds of an inch is considered satisfactory.

The degree of bleeding or oil retention is determined by placing the candle on a suitable paper, for example brown wrapping paper, and observing the degree of staining produced on the paper after 16 hours at 71° to 75° F.

Incrustation or wax "hang-up" is evaluated by examining the inner walls of the container after a candle has been burned therein and noting the quantity of wax deposited thereon.

The candle disclosed herein is markedly superior to conventional scale wax candles, and is especially suitable for religious purposes. A principal advantage is that it is now possible to make a candle having high oil retention properties which can tolerate up to about 2.5% by weight of oil. Other advantages of this improved candle are that it does not bulge when molded, nor deform when exposed to moderate heat. It burns cleanly without leaving an incrustation on the walls of the containing vessel.

In accordance with this invention, therefore, a paraffinic wax candle is disclosed having a melting point between 110° and 125° F. A. M. P., and preferably between 115° and 120° F. A. M. P., and having as its major constituent a narrow cut paraffin wax melting between 110° and 125° F. A. M. P., and as its minor constituent a high boiling crystalline paraffin wax. The major constituent varies between 85% and 99.5% depending on the quantity of other constituents employed. It is apparent that, if desired, stearic acid may be used to improve its appearance, or a small percentage, for example up to about 3%, of other additives such as dyes, microcrystalline waxes, or polymers may be added.

Various modifications of the hereinabove described techniques as are known in the art may be used in the practice of this invention.

What is claimed is:

1. An improved wax composition for use in votive candles comprising a paraffin scale wax melting between about 110° and 125° F., A. M. P., and having a range of about 50° to 100° F. between the 5% and 95% distillation points, to which has been added from about 0.5% to 15% by weight, based upon the total composition, of a refined paraffin wax melting between about 145° and 160° F., A. M. P.

2. The composition defined in claim 1 in which the refined wax constitutes about 3% to 7% by weight of said composition.

3. The composition defined in claim 2 in which the refined wax constitutes about 5% by weight of said composition.

4. The composition defined in claim 1 having a melting point between about 115° and 120° F., A. M. P.

5. A process for preparing an improved wax composition which comprises blending about ½% to 15% by weight of a refined paraffin wax having a melting point between about 145° and 160° F., A. M. P. with a paraffin scale wax having a melting point between about 110° and 125° F., A. M. P., and a boiling range of from about 50° to 100° F. at 10 mm. of mercury absolute pressure.

References Cited in the file of this patent

UNITED STATES PATENTS

| | | |
| --- | --- | --- |
| 2,157,625 | Page | May 9, 1939 |
| 2,670,323 | Hunter et al. | Feb. 23, 1954 |
| 2,697,926 | Knox | Dec. 28, 1954 |